United States Patent [19]

Hunter

[11] 3,930,434

[45] Jan. 6, 1976

[54] HYDRAULIC CONTROLLER

[75] Inventor: Edwin J. Hunter, Rancho Sante Fe, Calif.

[73] Assignee: The Toro Company, San Marcos, Calif.

[22] Filed: Oct. 30, 1973

[21] Appl. No.: 411,155

[52] U.S. Cl. .................. 91/36; 91/413; 92/152; 137/624.18; 137/624.20; 251/230; 417/221; 417/510
[51] Int. Cl.² ......................................... F15B 21/02
[58] Field of Search ... 91/36, 413; 137/596, 624.18, 137/624.20; 417/221, 290, 298, 310, 510; 92/150, 152; 251/230

[56] References Cited
UNITED STATES PATENTS

| | | | |
|---|---|---|---|
| 1,238,670 | 8/1917 | Holbrook | 417/510 |
| 2,228,700 | 1/1941 | Hamner et al. | 91/36 X |
| 2,322,611 | 6/1943 | Winkler | 91/36 X |
| 2,516,149 | 7/1950 | Samiran | 137/624.18 X |
| 2,579,598 | 12/1951 | Morrison | 137/624.18 X |
| 3,033,000 | 5/1962 | Hibbert et al. | 91/36 X |
| 3,045,601 | 7/1962 | Rippingille | 91/36 X |
| 3,379,099 | 4/1968 | Missioux | 91/36 X |
| 3,422,847 | 1/1969 | Polizzi | 137/624.2 X |
| 3,428,085 | 2/1969 | Haberstump | 137/624.2 |
| 3,444,896 | 5/1969 | Van Deer Veer | 137/624.2 |
| 3,454,784 | 7/1969 | Wantz et al. | 137/624.18 X |

FOREIGN PATENTS OR APPLICATIONS

| | | | |
|---|---|---|---|
| 966,336 | 10/1950 | France | 417/310 |
| 1,231,997 | 5/1971 | United Kingdom | 417/221 |

Primary Examiner—Martin P. Schwadron
Assistant Examiner—Abraham Hershkovitz

[57] ABSTRACT

The hydraulic controller is for controlling the operation of a plurality of hydraulically controlled devices. Hydraulic fluid may be selectively distributed by the controller to various controlled hydraulic devices in a timed and predetermined sequence. The timing of the distribution of hydraulic fluid by the controller can be quickly and easily varied by various control knobs on the controller to thereby vary the timed operated period of the various machine operations controlled by such devices without affecting the timed operation of other machine operations. The controller is supplied with a source of hydraulic fluid under a generally constant pressure. Cam means are associated with each of a plurality of fluid flow distributing valves for operating such associated valve members in a predetermined sequence of valve positions upon advancement of the cam means relative thereto. Drive means including a pair of opposed indexing and timing device pistons; advance the cam means relative to the valves to operate them in sequence of positions and in operating intervals or dwell periods thereof. The indexing piston has an effective working diameter in its cylinder which is greater than that of the timing piston such that it normally overrides the timing piston. The cam drive means includes lost motion means for allowing the cam means and associated distributing valves to dwell during timing strokes. Fluid flow restrictor means adjustably restrict the flow of fluid through the venting means to control the speed of the timing stroke and thereby provide an adjustable timed interval of operation of the device then being operated.

24 Claims, 11 Drawing Figures

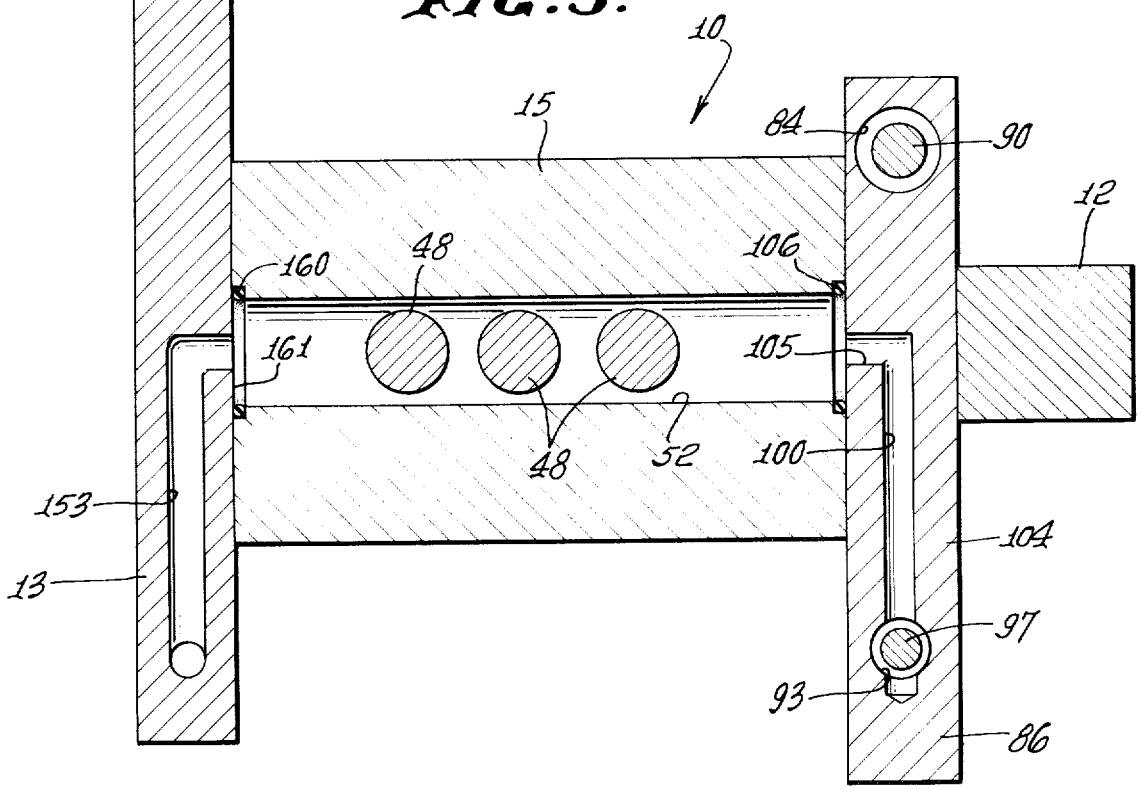
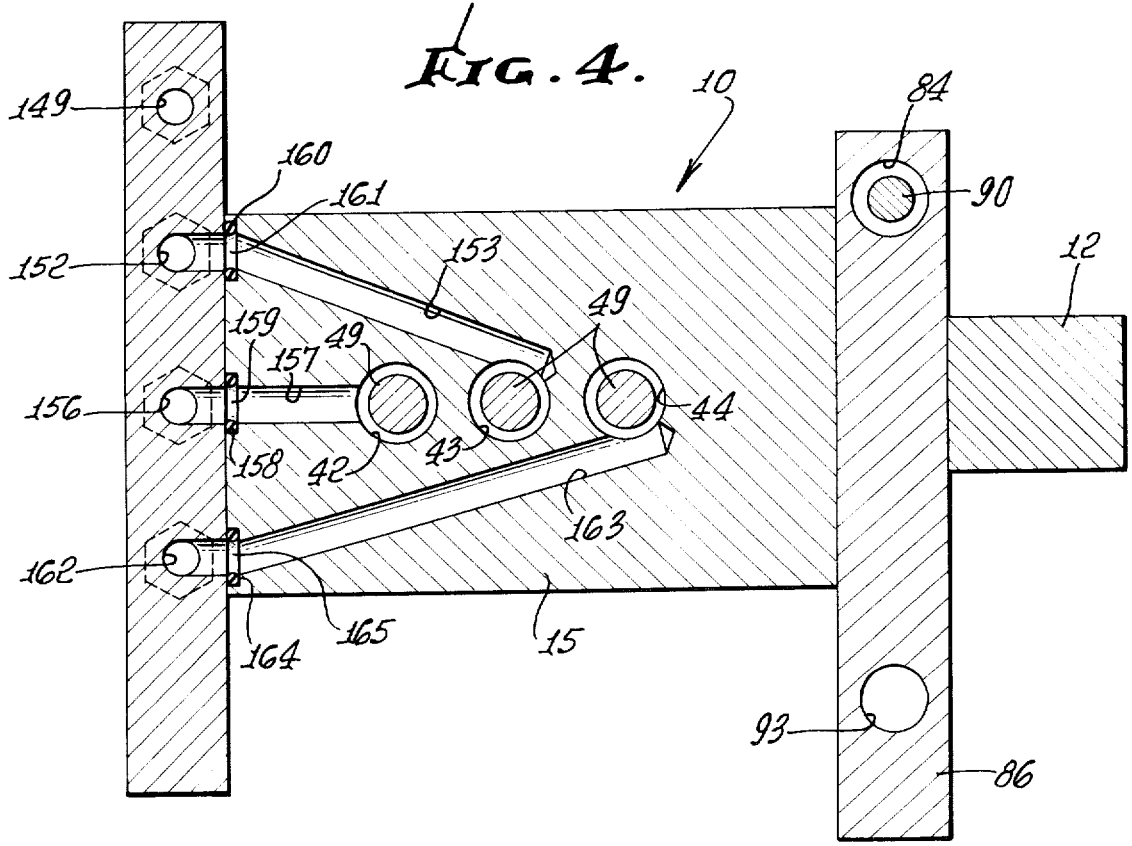

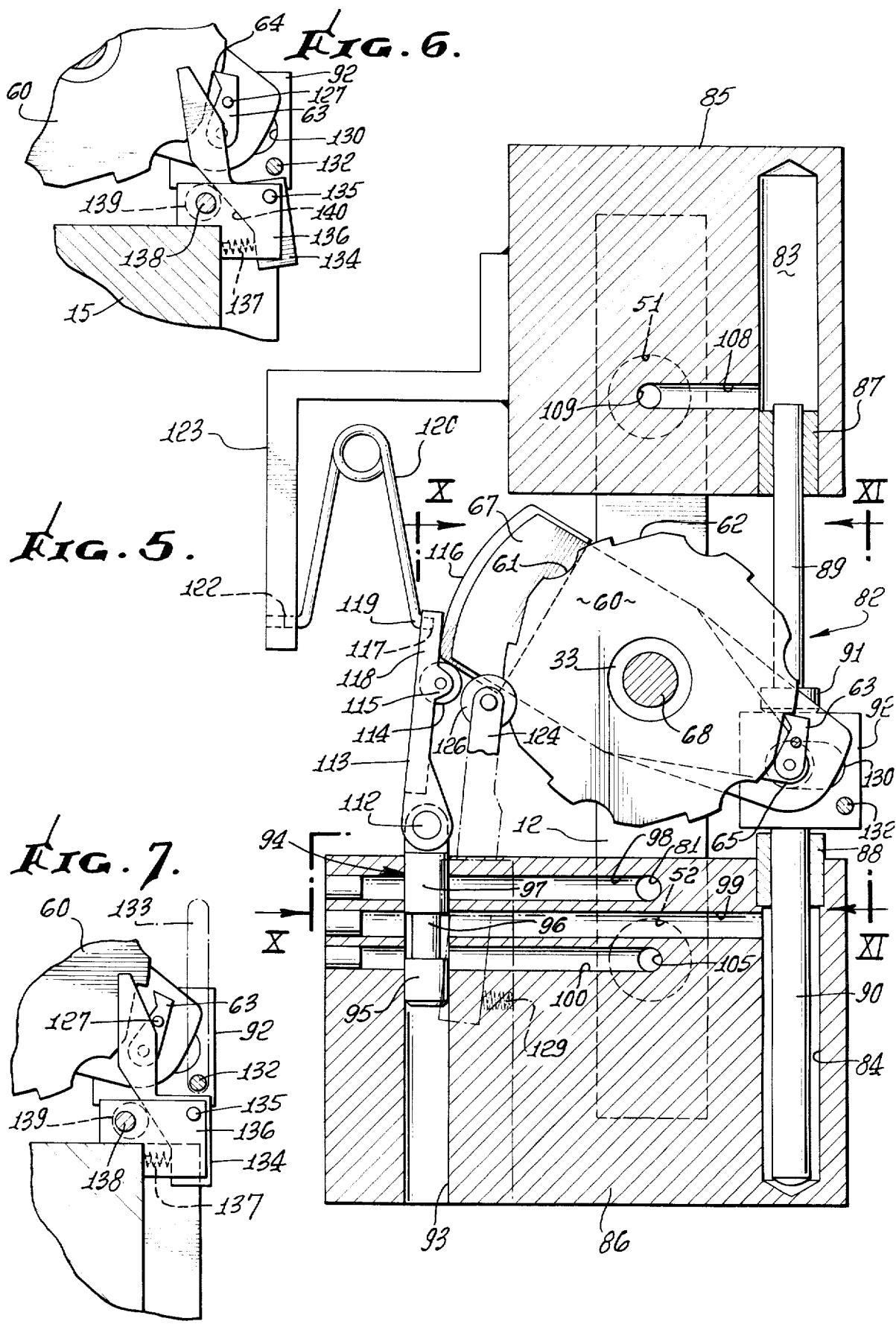

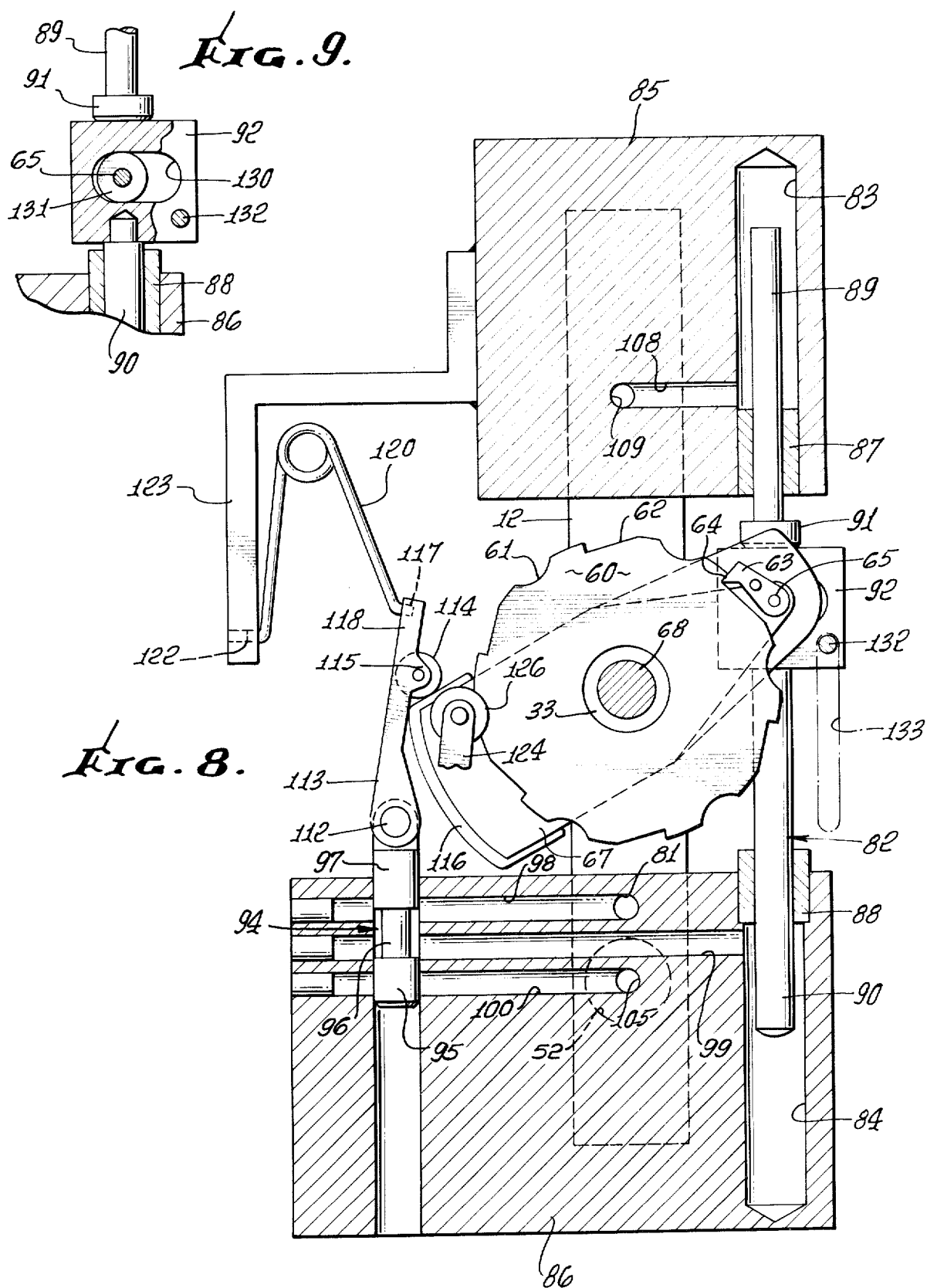

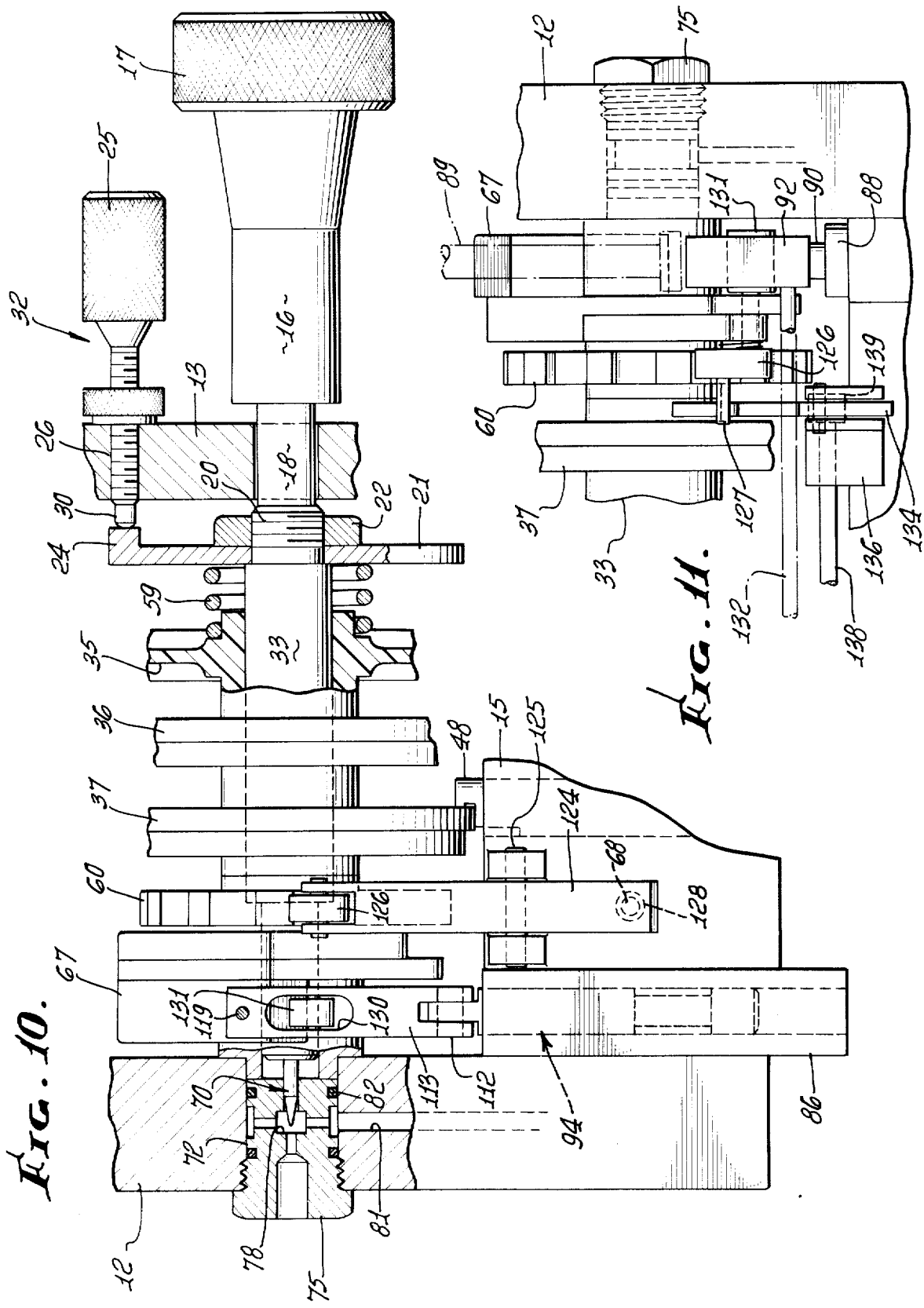

HYDRAULIC CONTROLLER

BACKGROUND OF THE INVENTION

1. Field of the Invention

This invention relates to a hydraulic controller for controlling the operation of a plurality of hydraulically operated devices in a predetermined sequence of individually adjustable timed intervals of operation for each such device. Machine operations, operated by such hydraulically operated devices, may be controlled in predetermined sequence with the timed interval of each given operation being controlled by corresponding control members of the controller which are individually adjustable for varying the length of intervals of operation for each of the machine operations.

2. Description of the Prior Art

Various types of control devices have been developed heretofore for controlling the operation of pilot valves, switches and other similar devices. Examplary of such controllers are the prior U.S. Pat. Nos. 3,404,227; 3,428,085 and 3,444,896. In these prior controllers, means have been provided for controlling the operation of associated pilot valves or switches in response to the operation of electrical motors, pneumatic motors and hydraulic motors. However, none of these devices have been found to be acceptable, or suitable, for use in controlling the operation of hydraulically operated devices such as are present in many presently used complex machines used in various production operations. By way of example, various known machines are employed in performing injection molding vacuum forming, blow forming, rotational molding and similar production operations which require the operation of various hydraulically operated mechanisms in a predetermined sequence. Generally, the hydraulic ram and cylinder utilized for opening and closing molds, moving turrets, etc. are in turn operated by hydraulically operated pilot valves. Such pilot valves typically are in turn operated by various solenoids, relays and associated electrical circuitry. The typical system for operating a complicated vacuum forming machine, or the like, usually includes a very complex electrical and hydraulic system including a large number of such relays, solenoids, pilot valves, etc. in addition to the main operated hydraulic devices performing the machine operations.

In view of the foregoing, it has been recognized that there is a real need for a hydraulically operated control device, suitable for being powered from the hydraulic fluid supply of the machine, for directly operating the various hydraulically operated devices of the machine which are performing the machine operations. Such a hydraulic controller would eliminate the necessity of complicated electrical circuitry, solenoids, relays and other associated electrical equipment as well as the inherent time delay attendant the necessary step-by-step operation of such components in a complicated electrical system. It has further been recognized that such hydraulic controller should be relatively easy to operate and should provide for the operation of the various machine operations in timed intervals, in a predetermined sequence and wherein the individual machine operations can be operated for selectable intervals of operating time.

SUMMARY OF THE INVENTION

Objects of the Invention

It is therefore an object of the invention to provide a hydraulic controller, operable from the supply of hydraulic fluid available for operating an associated machine having hydraulically operated devices, for selectively operating such devices in a predetermined sequence and controlling the interval or length of time of operation of each such device in independently adjustable manner such that the adjustment of the time of operation of any one given device will not affect, nor prevent, the adjustment of the time or interval of operation of any other given device of the machine.

It is another object of the invention to provide a hydraulic controller for controlling the operation of a plurality of hydraulically operated devices in a predetermined sequence of individually adjustable timed intervals of operation for each device wherein the controller is supplied with a source of hydraulic fluid under a generally constant pressure.

It is another object of the present invention to disclose and provide a controller as in the foregoing objects which overcomes the deficiencies of present electrical and hydraulic systems employing prolix numbers of timers, relays, solenoids, etc. and which is simply operable through available hydraulic fluid to provide an adjustable timed control of the operation of associated hydraulically operated valves or devices through controlling the distribution or flow of the available hydraulic fluid to such valves or operated devices in predetermined and adjustable manner.

It is another object of the present invention to provide and disclose a hydraulic controller as in the foregoing objects which simplifies and reduces the attendant costs of known systems for operating complicated hydraulically operated mechanisms such that it will provide for an easier maintenance, lower initial capital investment for the purchase thereof and provide for a more rapid and accurate control over the operations of the various hydraulically operated mechanisms of the machine with which the controller is to be associated.

INVENTION SUMMARY

Generally stated, the hydraulic controller according to the present invention, for controlling the operation of a plurality of hydraulically operated devices in a predetermined sequence of individually adjustable timed intervals of operation for each such device, and which is adapted to be connected to a source of hydraulic fluid under a generally constant fluid pressure, includes the provision of distributor means for distributing the flow of hydraulic fluid from such source to the various operated devices in a predetermined manner in response to operation of the distributor means through a sequence of individual positions of adjustment thereof and hydraulically operated drive means for operating such distributor means through its sequence of positions, such drive means being operable in an indexing mode to index the distributor means between positions of adjustments and being operable in a timing mode between indexing modes to maintain the distributor means in a dwell or timed interval at individual positions of adjustment during which the associated hydraulically operated devices are being operated. The timed interval of operation of such hydraulically operated devices, controlled by the dwell of the distributor means in its associated position of adjustment for a given operated device, is preferably accomplished by providing means for supplying hydraulic fluid from such source to the drive means to operate the drive means in both indexing and timing modes together with means associated with both the fluid supplying means and the drive means for adjustably controlling the time of operation of the drive means in its timing mode and thus the time of operation of the associated device. Such controlling of the time of operation of the drive means in its timing mode is, according to the present invention, preferably accomplished through the provision of means for modifying the flow of hydraulic fluid relative to the drive means during its operation in its timing mode, such modifying means being adjustably operable independently and sequentially during sequential operation of the distributor means in a manner such that the dwell of the distributor means, and consequent interval of operation for an associated device then being operated, is individually adjustable for each position of adjustment of the distributor means corresponding to a position of operation of the associated operated device.

More specifically, the fluid distributor means, according to the present invention, includes the provision of a plurality of fluid flow distributing valves, each having inlet means for connection to the aforementioned hydraulic fluid source, outlet means for connection to one of the associated operated devices and a movable valve member for selectively interconnecting the inlet and outlet means. Cam means are preferably associated with each of the fluid flow distributing valves for operating the associated valve member in a predetermined sequence of valve positions upon advancement of the cam means relative thereto under urging of the drive means. The aforementioned hydraulically operated drive means, more specifically, includes the provision of a timing mode drive piston and cylinder, an indexing mode drive piston and cylinder, force transmitting means associated with the cam means for translating reciprocal motion of the pistons into advancement motion for the cam means and piston mounting means for mounting such pistons in opposed driving relation to the force translating means. Such indexing piston is preferably provided with a larger effective diameter exposed to the hydraulic fluid than that of the timing piston, such that, when the pistons are equally exposed to hydraulic fluid under pressure from said source, the indexing piston will normally override the timing piston in moving in an indexing mode to index the associated distributor means between its positions of adjustment. The force translating means may include a one way drive ratchet mechanism for driving the distributor means in an incremental advance during the indexing mode of operation of the pistons. On a reversal of movement of the pistons, during a timing mode of operation, the distributor means is allowed to dwell in a stationary position during which the associated operated devices, then being operated, are maintained in a timed period of operation, the timing thereof being accomplished through the control of the length of time for the return of the pistons in a timing mode as summarized herein below.

As particularly contemplated within the present invention, means are associated with the fluid supplying means and drive means for adjustably controlling the time of operation of the drive means in its timing mode for each individual corresponding position of adjustment of the distributor means. The means for modifying the flow of fluid relative to the drive means during such timing mode, as more specifically stated, preferably includes reversing valve means associated with fluid flow line means to the pistons for alternately connecting the indexing mode cylinder to the source of hydraulic fluid or to an outlet line and valve reversing means associated with the movement of the pistons for operating the reversing valve to vent the cylinder associated with the larger diameter indexing piston at the end of an indexing mode movement. On venting of the indexing cylinder, the smaller diameter timing mode piston overrides the indexing piston. The speed of movement of the pistons during such timing mode is preferably controlled by restricting the flow of hydraulic fluid from the cylinder associated with the indexing piston. At the end of a timing mode movement of the pistons, the valve reversing means is reversed to close the indexing cylinder vent means and reconnect both indexing and timing cylinders equally to the source of hydraulic fluid, thus initiating an indexing mode operation.

The speed of movement of the pistons during a timing mode, and thus the interval of operation of the associated operated device, may be controlled by the provision of an adjustable restricting member associated with an orifice through which the vented fluid passes. A flow restricting member may be mounted to a shaft which is biased toward a valve open position wherein the restrictor is withdrawn relative to the orifice. This shaft may be rotated in unison with the camming means and have its own cam member mounted for interfering relation with a plurality of adjustable timing control members mounted to the controller in an array about the shaft. By adjusting the control members, different amounts of deflection of the shaft associated cam may be produced and thereby different restrictions provided to the venting means for each adjustment of the control members. An individual control member may be provided in correspondence to the individual positions of adjustment of the distributor means which correspond to the operation of the various control devices.

As will be seen from a consideration of the foregoing, as well as the following more detailed explanation of a preferred exemplary embodiment of controller in accordance with the present invention, the hydraulic controller of the present invention accomplishes the foregoing objects and provides for the control of a plurality of hydraulically operated devices in a predetermined sequence of individually adjustable timed intervals of operation for each device. Through adjustment of each individual control member associated with the device, the timing interval for each given position of the associated distributor means during its dwell condition may be controlled. These advantages as well as others and additional objects of the present invention will become more readily apparent to those skilled in the art from a thorough consideration of the following detailed description of a preferred exemplary embodiment of the controller.

BRIEF DESCRIPTION OF THE DRAWINGS:

FIG. 3 is a vertical cross-sectional view of the controller of FIG. 1 taken therein along the plane III—III;

FIG. 4 is a vertical cross-sectional view of the controller of FIG. 1 taken therein along the plane IV—IV;

FIG. 5 is a horizontal cross-sectional view of the controller of FIG. 1 taken therein along the plane V—V showing the illustrated portions thereof at the beginning of an indexing mode of operation thereof;

FIG. 6 is a detailed, partially sectional view of a portion of the controller illustrated in FIG. 5;

FIG. 7 is a view similar to that of FIG. 6 showing a ratchet member or release dog in released position;

FIG. 8 is a view similar to that of FIG. 5 showing the controller portions illustrated at the beginning of a timing mode;

FIG. 9 is a detailed view, partially in section, of a portion of the controller of FIG. 8;

FIG. 10 is a sectional view of the controller of FIG. 5 taken along the plane X—X; and FIG. 11 is an elevational view of the controller of FIG. 5 taken therein along the plane XI—XI.

BRIEF DESCRIPTION OF OPERATION OF PREFERRED EMBODIMENT

Figure 1:
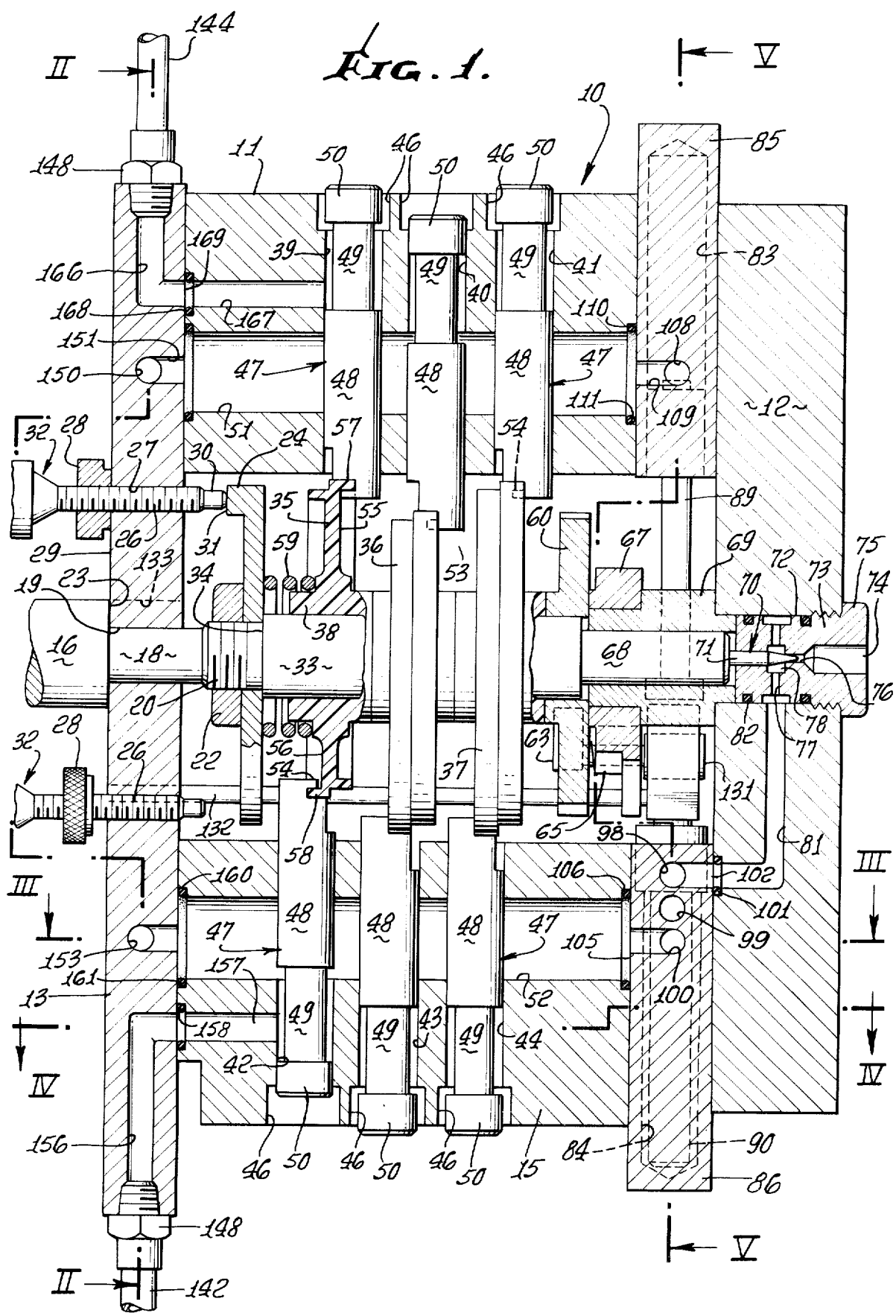
FIG. 1 is a vertical cross-sectional view taken through the approximate middle of a prefered exemplary embodiment of the hydraulic controller of the present invention.

Hydraulic fluid under generally constant pressure is supplied by inlet line 140 (FIG. 2) into distributor chambers 51 and 52 where it is selectably distributed via valves 48 through the respective outlet lines 141 through 146 to the controlled devices. Control of each of valves 48 is accomplised by the positioning of cam members 35, 36 and 37 (FIGS. 1 and 10) rotatably driven by shaft 33. Shaft 33 is incrementally driven by the hydraulic drive means, including opposed pistons 89 and 90, to open and close the respective valves 48 in a predeterminable sequence to operate the controlled hydraulic devices connected via lines 141 through 146.

A dwell period, while cam members 35, 36 and 37 and associated valves 48 are stationary, determines the time of operation of any given controlled device whose respective valve 48 is in an open position allowing application of hydraulic fluid pressure to such hydraulically controlled device.

Timing piston 89 and indexing piston 90 are mounted in opposed relation (FIG. 8) with piston 89 normably connected to the source of pressure fluid and piston 90 being alternately connected to the source of hydraulic pressure and a vent 74 by the reversing valve 94, which is operated at the end of axial travel of the pistons in either direction. Since indexing piston 90 is provided with a larger diameter, it normally overcomes the timing piston (when both pistons are connected to the same source of hydraulic fluid) to cause the aforementioned incremental advancement of the cam members through the drive of ratchet member 63 operating upon wheel 60 which is connected to cam member drive shaft 33. At the end of an indexing mode (FIG. 8) the reversing valve 94 connects the indexing piston cylinder 84 to the vent 74. The time for the return of the opposed piston members from the position of FIG. 8 to that of FIG. 5, during which the cam members 35, 36 and 37 and valves 48 are stationary or dwell, is determined by the adjustment of the restrictor valve 70, including valve member 71, relative to the venting orifice 76.

The position of the restrictor flow member 71 is determined by the vertical adjustment of integral shafts 33 and 68, to which it is mounted, under the urgings of spring 59 and plate 21 provided at the upper end of shaft 33 as plate 21 is rotated under the respective adjustable control members 32. As seen in FIG. 1, the boss 41 on plate 21 is shown underlying a control member 32 which has been adjusted to cause depression of plate 21 and consequently shaft 33, against the bias of spring 59, to move the restrictor member 71 toward a closing position in orifice 76. Therefore, the venting of the indexing cylinder 84 is restricted and the timing mode return of pistons 89 and 90 from the position of FIG. 8 to that of FIG. 5 is prolonged. Selective adjustment of the position of the control member thus controls the operating time for the particular hydraulic device being operated for the corresponding position of the cam members and valves.

On completion of the timing mode movement of the pistons 89 and 90, the reversing valve 94 reverses fluid communication back to the indexing piston cylinder 84, closing the vent connection, and the larger diameter indexing piston 90 over-runs the counter force of the timing piston 89 to quickly index shaft 33 and the associated cam members 35 through 37 to the next incrementally advanced position. The next radially positioned control member 32 may then control the time of dwell for the cam members and valves by the restriction of flow of fluid from the indexing cylinder through orifice 76 to provide a timing of the operation of the controlled devices then activated via lines 141-146 for that positioning of the valves 48.

DETAILED DESCRIPTION OF THE PREFERRED EMBODIMENT

The preferred exemplary embodiment of hydraulic controller is intended for use in controlling the operation of a machine having a plurality of hydraulically operated devices as well as a source, or connection to a source, of hydraulic fluid under pressure. It is not unusual for some of the larger machines to require an operating fluid pressure of between 1200 and 1500 pounds per square inch. The controller of the present preferred embodiment may be operated within a fairly wide range of pressures, i.e., 200 to 5,000 per square inch, by way of example. In any event, whether such source of hydraulic fluid is available from a machine to be controlled by the controller, or from some other source, it is desirable to provide a supply of hydraulic fluid under a generally constant pressure to the instant exemplary controller device. The assurance of such constant pressure supply of hydraulic fluid can be obtained through the use of otherwise conventionally known pressure regulators which may be connected into the fluid input line to the controller.

Referring now to FIGS. 1 through 4, particularly, the exemplary controller is indicated generally at 10. The controller includes a lower base plate 12, an upper top plate 13 and a pair of interconnecting members or valve bodies 11 and 15. Suitable fastening means may be provided for securing members 11 and 15 to plates 12 and 13.

Figure 2:
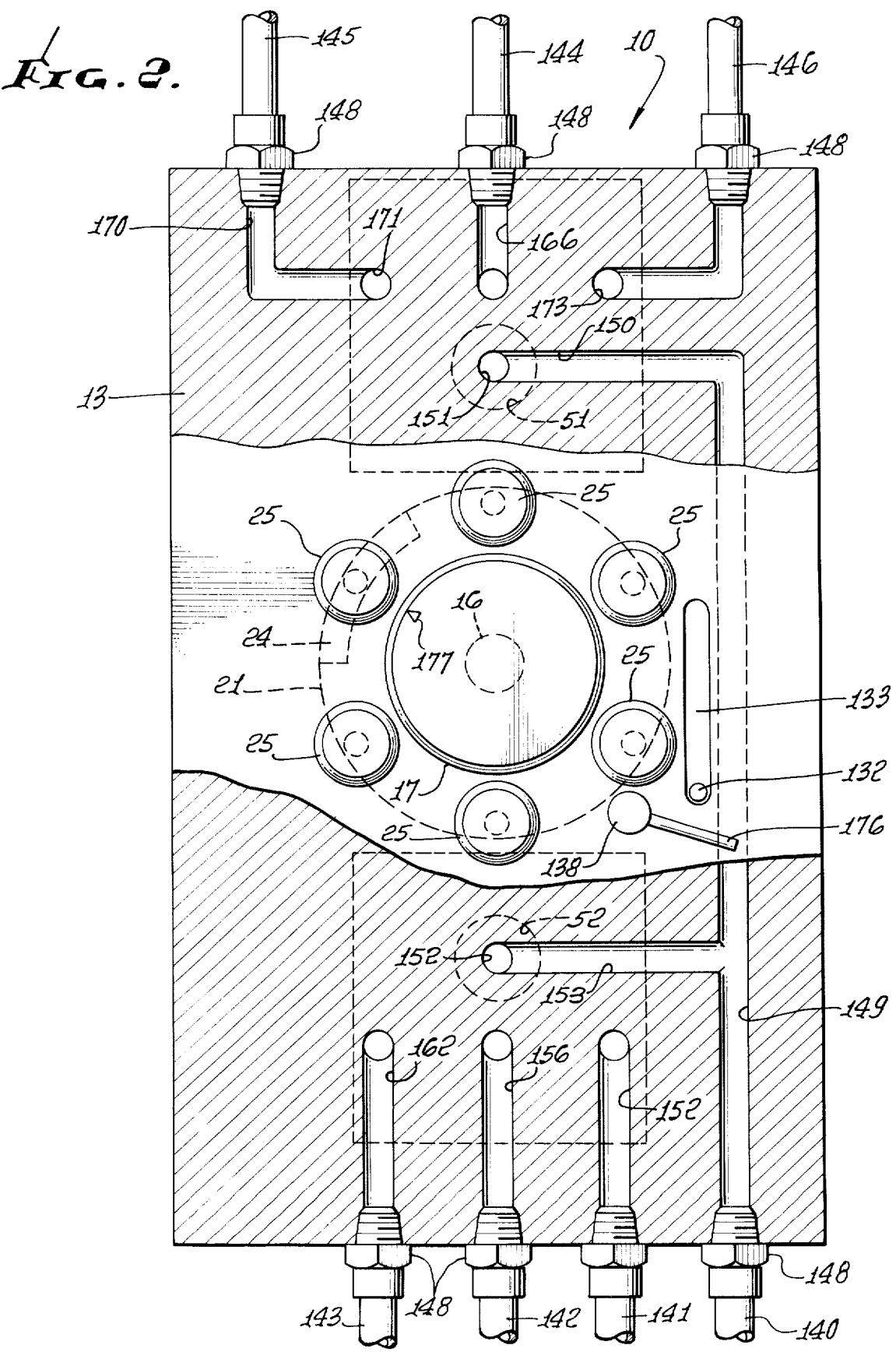
FIG. 2 is a horizontal cross-sectional view of the controller of FIG. 1 taken therein along the plane II—II.

The controller is provided with means for connection to a source of hydraulic fluid under pressure. Such means, in the exemplary embodiment, include the provision of inlet line 140 see FIG. 2, which is adapted by associated end fitting 148 for connection into top plate 13 in fluid communication with inner line 149. A pair of fluid supply reservoirs or chambers 51 and 52 are provided within the inner members 11 and 15 respectively, as best seen in FIGS. 1, 2 and 3. Each of these supply chambers 51 and 52 is connected to the inlet lines 140, 149 which in turn are to be connected to a source of hydraulic fluid under constant pressure. As seen in FIG. 1 and 2, fluid supply chamber 51 is connected via internal flow lines 151, 150 and 149 to inlet line 140.

As best seen in FIGS. 1 and 3, the fluid supply chamber or reservoir 52 is connected via lines 152, 153 and 149 to inlet 140. Therefore, the fluid supply chambers 51 and 52, according to the preferred exemplary embodiment, are provided with a supply of hydraulic fluid under constant pressure which, as noted above, may be maintained by a pressure regulator device from a source of hydraulic fluid presumably available for operating the machine with which the controller is to be utilized.

Distributor means are provided for distributing the flow of hydraulic fluid from the source thereof provided by supply chambers 51 and 52, and their connections to inlets 140 and 147 as hereinbefore explained, to a plurality of hydraulically operated devices in a predetermined manner in response to operation of the distributor means through a sequence of individual positions of adjustment thereof. In the exemplary embodiment, such distributor means includes the provision of such fluid supply chambers 51 and 52 in association with a plurality of fluid flow distributing valves, indicated generally at 47, for selectively distributing hydraulic fluid to outlet lines 141 through 146. Each of the outlet lines 141 through 146, connected to controller housing 11 by suitable end fittings 148, is adapted to be connected to a hydraulically controlled device of the associated machine which preferably is the hydraulic means performing machine operations, although it may be a pilot valve which in turn operates such machine operating device.

The plurality of fluid flow distributing valves, indicated generally at 47, each are provided with a bore, as bores 39 through 44, having inwardly directed ends of inlets opening to the associated fluid supply chambers 51 and 52, respectively. The exemplary flow valves 47 are of the spool valve type wherein a main body portion 48 is slideably mounted in the respective bore, is provided with a valve opening or reduced diameter portion 49 and a valve closing or head portion 50. Each of the valve bores 39 through 44, as best seen with respect to bores 42 through 44 in FIG. 4, are provided with outlet means for connection of the respective bore to one of the outlet lines 141 though 146. Hydraulic fluid may therefore be selectively directed from the supply chambers 51 and 52, to the respective outlet lines via the outlet means as explained more fully hereinafter.

Referring now to FIGS. 1 and 4, it can be seen that the flow valve bore 42 communicated with the outlet line 142 via the interconnecting flow lines or internal passageways 156 and 157. A suitable O-ring 158 may be disposed in a ring groove 159 at the junction of chamber 42 with passageway 156 to seal the passageway at that location. As seen in FIG. 1, the spool valve 47 associated with bore 42 is shown in a position connecting outlet line 142 (via interconnecting lines 156 and 157) to the supply chamber 52 as well as closing a vent or exhaust via the open enlarged outer bore portion 46. Each of the bores 39 through 44 is provided with a larger diameter outlet portion 46 so that outward movement of the associated spool valve moves the valve head 50 out of the bore and communicates the associated flow lines to the exterior of the controller which is preferably provided over a suitable collecting reservoir for recirculation of the hydraulic fluid. Alternatively, inward movement of each spool valve 47, as more fully explained hereinafter, selectively connects the associated outlet line, such as line 142 to the associated fluid supply chamber, such as chamber 52.

As with the case of the valve 42 hereinabove explained, the other valve bores are connected to the respective fluid outlet lines for controlling respective operated devices. Again referring to FIGS. 2 and 4, bore 43 is connected to outlet line 141 via the interconnecting flow lines or passages 153 and 152. Bore 44 is connected to outlet line 143 via interconnecting flow lines 163 and 162.

The valve bores 39 through 41 are similarly connected to the outlet lines 144 through 146. As seen in FIGS. 1 and 2, bore 39 is connected to outlet line 144 via flow lines 167 and 166. As seen in FIG. 2, (and similarly to the prior bores illustrated in FIG. 4) outlet line 145 is connected by flow lines 170 and 171 into valve bore 41. Outlet line 146 may be provided in fluid communication with the valve bore 40 via line 173 in similar manner. Suitable O-ring seals may be provided between members 14 and 15, and top plate 13 with regard to the lines to outlet lines 144 through 146 as seen in FIG. 4, including O-rings 159 in groove 158, O-ring 160 in groove 161 and O-ring 164 in groove 165, with respect to the outlet lines 141 through 143.

Cam means are associated with each of the fluid flow distributing valves 47 for operating the associated valve members in a predetermined sequence of valve positions upon advancement of the cam means relative thereto. In the exemplary embodiment, such cam means include the provision of a plurality of double cam members 35, 36 and 37, as best seen in FIGS. 1 and 10, on shaft 33 for rotation therewith, although, as subsequently explainted, shaft 33 is axially slidable relative thereto. Cam members 35 through 37 may be provided with conventional key way engagement with shaft 33 in order to be rotated thereby. Such key ways may be provided in each of the hub portions 38 of members 35 through 37 which encircle shaft portions 33 and rotate therewith. As best seen in FIG. 1, the vertical array of cam members rest upon drive wheel 60 which is part of the drive means to be explained in detail hereinafter. The cam members 35 through 37 are driven by shaft 33 which in turn is driven by wheel 60. As seen in FIGS. 1 and 2, each of the cam members 35 through 37 is formed of a disc like body 55 which extends radially outwardly from the associated hub portion 38. Oppositely directed peripheral lips or track members 57 and 58 are formed about the periphery of each disc 55. Lip or track entraining means are provided on the inner terminal ends of the spool valve bodies 48, including the terminal end arcuate flanges 54 for entraining the associated cam lip or tracks as seen in FIG. 1. Each of the upper and lower peripheral lips or tracks on each cam member are of non ircular configuration so that, as the cam means are ro..,ed by drive means hereinafter explained, the associated spool valves are moved radially inwardly and outwardly of the controller to selectively connect the various outlet lines 141 through 146 to the fluid supply chambers 51 and 52, block the flow of fluid in or out of the lines connected to said outlet lines to maintain pressure on the associated device, or move further radially outwardly to vent the outlet line associated internal flow lines to the exhaust vent openings 46 to allow discharge of hydraulic fluid from the associated operated means to the aforementioned fluid accumulating reservoir to be associated with the controller.

Hydraulically operated drive means are provided for operating the distributor means, including the flow valves 47 and associated cam means thus far described through their respective sequence of positions. As will be explained in detail, the preferred exemplary embodiment of hydraulic drive means is operable in an indexing mode to index the cam means and associated flow valves between positions of adjustment and is operable in a timing mode during which the camming means and associated flow valves are maintained in a stationary or dwell condition during which an associated hydraulically operated device may be maintained in an operating condition for a timed interval of operation. In the preferred exemplary embodiment, such hydraulically operated drive means includes the provision of a pair of opposed drive pistons including a timing piston or rod 89 and an indexing piston or rod 90. As will be explained more fully hereinafter, the operation of these two opposed pistons is utilized in the exemplary embodiment for driving the aforementioned cam means and associated spool valves for directing the flow of hydraulic fluid from the chambers 51 and 52 to the various outlet lines connected to the operated devices in a predetermined sequence.

As seen in FIGS. 5 and 8, the timing mode piston 89 is mounted via a journal block 87 for reciprocal movement relative to a timing cylinder 83 formed in a cylinder block 85 disposed between base plate 12 and inner member 11 as also seen in FIG. 1. The indexing piston or ram 90 is mounted via journal block 88 for sliding movement relative to its indexing cylinder 84 formed within cylinder block 86 which in turn is mounted between base plate 12 and inner member 15 as also seen in FIG. 1. The indexing mode piston 90 is provided with a larger effective diameter exposed to the fluid pressure to be introduced into its chamber or cylinder 84 than that of the timing piston or ram 89. Therefore, when each are connected to the same, or generally equal, fluid pressure, the indexing piston or ram 90 will normally override the timing piston and, as explained hereinafter move the two pistons and associated force transmitting means in an indexing motion to index the associated camming means between its positions of adjustment.

Hydraulic fluid flow system means are provided for connecting both of the timing and indexing cylinders 83 and 84 to a source of hydraulic fluid. In the exemplary embodiment, and as best seen in FIGS. 1, 5 and 8, the timing mode cylinders 83 of the hydraulic drive means is connected via internal flow lines 108 and 109 to the previously described hydraulic fluid supply chamber 51. An O-ring 110 may be provided in groove 111 at the juncture between member 14 and cylinder block 85 as seen in FIG. 1 to seal these passageways. The indexing cylinder 84 of the hydraulic drive means is connected to the other fluid chamber 52 via internal flow lines passageways 99, 93, 100 and 105 as best seen in FIGS. 1, 5 and 8. As noted hereinbefore, when the two hydraulic cylinders 83 and 84 are connected to the two respective supply chamber 51 and 52, indexing piston or ram 90 overrides timing piston or ram 89 to drive the pistons and associated force transmitting means from the position of FIG. 5 to that of FIG. 8 in an indexing motion.

Force transmitting means are associated with the cam means 35 through 37 and pistons 89 and 90 for translating the reciprocal motion of the pistons into an advancement or rotary drive motion for the cam means. In the exemplary embodiment such force transmitting means includes the provision of a ratchet or drive wheel 60, as best seen in FIGS. 1, 5, 8, 10 and 11. The drive ratchet wheel 60 is secured to shaft portion 33 in driving relation therewith. The periphery of wheel 60, as best seen in FIGS. 5 and 8, includes a plurality of generally evenly spaced detent portions 61 and ratchet portions 62. Wheel 60 is driven in counter clockwise direction under the influence of the dog or ratchet member 63. Dog or ratchet 63, having an outer engaging end 64 is pivotally mounted on a shaft 65 which in turn is mounted in a bore 66 provided in lever arm 67. Lever arm 67 is rotatably mounted or journaled upon journal block 69, as seen in FIG. 1, for arcuate movement about the center of rotation of wheel 60. A torsion spring is provided for biasing dog 63 into the ratchet wheel engaging position of FIGS. 5, 6 and 8.

A block member 92 may be provided on the outer end of indexing ram or piston 90, as best seen in FIG. 9, which is adapted to be abutted by an end 91 of timing ram or piston 89. Under reciprocal movement of the pistons or rams 89 and 90, block 92 moves in a reciprocal manner as does the drive cam wheel 131 entrained in slot 130 in block 92. Wheel 131 is connected via shaft 65 to arm 67 to move the arm in an arcuate motion as aforementioned, the roller moving radially in the compensating slot 130 in order to translate the reciprocal linear motion of the pistons 89 and 90 into a reciprocating arcuate movement for lever 67. During an indexing motion of the pistons from the position of FIG. 5 to that of FIG. 8, the drive ratchet wheel 60 will be rotated one incremental arcuate advance via lever arm 67 and associated dog 63. On a reversal of the piston members, as hereinafter explained, during a timing mode of operation therefor, the drive wheel 60 will be allowed to dwell in a stationary condition as the ratchet or dog 63 merely rides about the surface of the stationary wheel, the aforementioned spring biased upon the dog yielding in a generally lost motion operation between the return motion of the pistons and lever arm 67 relative to wheel 60 from the position of FIG. 8 to that of FIG. 5.

Means are provided for holding the wheel 60 in an aligned or indexed position of adjustment corresponding to a desired position of adjustment of the associated flow valves 47 via the interconnecting cam means 35 through 37. Such holding means in the exemplary embodiment comprise the provision of a spring biased detent or roller member 126, adapted to engage the respective detent or cut-off portions 61 of wheel 60 as seen in FIG. 5 and 8. Holding detent or wheel 126 is mounted via arm 124 which in turn is pivotally mounted by pin 125 to the cylinder block 86. A suitable spring 129 may be provided between cylinder block member 86 and a free end of lever 124, as seen in FIG. 5, to act about pivot pin 125 in biasing roller or wheel 126 into the respective detents 61 on the wheel. The provision of these holding means assures the precise orientation of the spool valves in the desired position of adjustment as well as to resist any slight reverse rotational movement otherwise imparted to wheel 60 during retraction of ratchet or dog 63 from the position of FIG. 8 to that of FIG. 5.

Manually operable means are provided for holding the ratchet member or dog 63 in an inoperable or released position in the event it is desired to manually interrupt the sequence of operations of the controller. As seen in FIGS. 6 and 7, the ratchet member or dog 63 as discussed hereinbefore as normally biased into a position of engagement between its projection 64 and the ratchets 62 of wheel 60. A pin 127 may be provided on dog 63 to be engaged by a pivoted manually operable lever 134 in order to hold it in release position as seen in FIG. 7. The lever or cam arm 134 overlies dog 63 and ratchet wheel 60, as seen in FIGS. 6 and 7, and is pivotal about a mounting pin 135 which is supported from cylinder block 86. A slot 136 may be formed in the member 15 for receiving the free end of a spring 137, the spring biasing cam lever 134 normally to a non-dog interferring position as seen in FIG. 6. A cam member 139, eccentrically mounted on pin 138 is adapted to be rotated from the position of FIG. 6 to that of FIG. 7 in order to cam the cam lever 134 against dog pin 127 to move the dog to the position of FIG. 7. As seen in FIGS. 2, 5, 8 and 11, pin 138 may be provided to extend through the upper plate 13 (FIG. 1) wherein associated manually moveable lever arm 176 may be provided. As can be seen from the foregoing, an operator of the hydraulic controller may manually move arm 176 to selectably lock or hold the dog 63 in a release position to interrupt its otherwise indexing advancement of the drive wheel 60, associated cam means and flow valves 47 even though the hydraulic drive means, including pistons 89 and 90 continue to move in an indexing mode from the position of FIG. 5 to that of FIG. 8. The ability to disconnect the drive means from the distributor means is considered a safety feature in the event that prompt interruption of machine operations is required.

Fluid flow modifying means are provided in association with the hydraulically operated drive means for adjustably controlling the time of operation of the drive means in its timing mode for each individual corrresponding position of adjustment of the associated distributor means, including in the preferred embodiment the aforedescribed camming means and associated flow distributing valves. In the preferred exemplary embodiment, such flow modifying means include means for modifying the flow of hydraulic fluid from the supply chamber 52 relative to the indexing drive cylinder 84 during a timing mode of operation thereof. More specifically, such flow modifying means, in the exemplary embodiment, includes means for reversing the connection of the indexing cylinder 84 from its supply chamber 52 to a venting outlet line and preferrably means for restricting the venting of the indexing cylinder in variable amounts in order to control the rate of advancement of the timing piston overriding the indexing piston, such overriding occurring during venting of the indexing cylinder 84 as hereinafter explained.

Referring to FIG. 5, it can be seen that when the larger diameter indexing piston 90 is in communication with its source of hydraulic fluid in chamber 52 via lines 99, 93, and 100 and 105, it will override the timing piston 89. However, as contemplated within the present invention and as illustrated in the preferred exemplary embodiment, means are provided for venting the indexing cylinder 84 to atmosphere or a collecting reservoir via outlet lines 99, 93, 98, and 81 to a restricting means, indicated generally at 70, as hereinafter explained. As seen in FIG. 5, a reversing valve, indicated generally at 94, of the spool valve type having a body 97, reduced valve portion 96 and spool or head end 95 is provided for sliding movement in the bore 93. When reversing valve 94 is positioned to interconnect chamber 52 via lines 105, 100, and 93 past the reduced portion 96 and through line 99 to cylinder 84, an indexing mode of operation is produced. If the valve 94 is shifted to close off the lines leading to supply chamber 51 and interconnect line 99 to the vent lines 98 and 81, then the hydraulic fluid pressure in hydraulic cylinder 84 is relieved and the continued application of hydraulic fluid pressure in timing cylinder 83 causes the timing piston 89 to override the indexing piston 90 in a timing mode of operation for the associated pistons and force transmitting means interconnecting them to the distributor means hereinbefore explained.

Means for reversing the position of valve 94 are provided to be operated in response to movement of the pistons 89 and 90. As seen in FIGS. 5, 8 and 10 the valve body 97 is provided with a pin 112 to which is pivotally mounted a lever arm 113. A roller 114 is mounted to flanges 115 on the lever arm and is adapted to roll over and about a cam end 116 provided on the lever arm 67. Lever 113 is further provided with a hole 117, into which a free end 119 of spring 120 is fitted, the other end 122 of the spring being fitted into a suitable bore provided in a mounting bracket 123 as best seen in FIGS. 5 and 8. Spring 120 is thereby adapted to bias the lever arm 113 in a clockwise direction of rotation about its pivot pin 112 into rolling engagement with the associated cam surface 116. As can be seen from a comparison of FIGS. 5 and 8, the reversing valve 94 is axially moved within bore 93 to selectively connect cylinder 84 between the fluid supply of chamber 52 and the vent of line 81 in response to the rolling movement of roller 114 under the action of spring 120 either under or over the cam member 116. The appropriate reversing of the indexing and timing cylinders may thereby be accomplished.

Flow restricting means are provided for selectively controlling the venting or release of fluid from the indexing cylinder 84 to thereby control the rate of movement of the drive means in its timing mode return from the position of FIG. 8 to that of FIG. 5 while the associated camming means and flow valves, comprising the distributor means aforedescribed, are maintained in a dwell condition establishing the interval of operation for the associated operated devices. In the exemplary embodiment, such flow restricting means is indicated generally in FIG. 10 at 70 and includes an orifice restrictor member 71 for restricting fluid flow from vent line 81 through a restricted orifice 76 communicating by line 77 with vent line 81 and an associated outlet 74. Line 77, and inner valve chamber 78 above orifice 76, the orifice 76 and outlet 74 may all be formed integrally of a threaded, nut-like, member 75 which can be threaded into base plate 12 beneath the hydraulic drive means as illustrated in FIGS. 1 and 10. Restrictor member 71 is illustrated in a full open position in FIG. 10, and fully closed position in FIG. 1.

Means are provided for mounting the flow restricting member 71 for vertical axially movement relative to orifice 76 between the full open and full closed positions of FIGS. 10 and 1 respectively. In the exemplary embodiment, such mounting means includes the provision of mounting shaft 68 on the lower end of main shaft 33 which is vertically movable relative to the drive wheel 60 and associated cam members 35 through 37, but is driven by wheel 60 as aforenoted to drive the cam members. The shaft 33, and depending portion 68 mounting member 71 is biased upwardly in FIGS. 1 and 10 via a spring 59 interposed between a plate 21 held to shaft 33 via lock nut 22. As seen in FIGS. 1 and 10, plate 21 is held down on a shoulder surrounding upper reduced, threaded portion 20 via lock nut 22. Spring means 59 normally biases shaft 33 and the associated restrictor member 71 into the valve open position of FIG. 10 wherein the restrictor member 71 is withdrawn relative to orifice 76. In this condition, a virtually free venting of the indexing cylinder is provided so that a very rapid timing mode return of the pistons would occur and a very short dwell for the cam means and associated valve members 47 would result. As member 71 is moved downwardly against the bias of spring 59 by means hereinafter explained, the flow fluid from the hydraulic cylinder is restricted and the timing period of the aforementioned dwell is extended.

A plurality of adjustable timing control members are mounted on the controller in an array about shaft 33 in adjustable interfeering contact with a shaft associated cam to control the vertical disposition of the restrictor member relative to orifice 76. As seen in FIGS. 1, 2 and 10, a plurality of adjustable timing control members, indicated generally at 32, and having control knobs 25, are mounted in a generally circular array in top plate 13 about the shaft 33 to which member 71 is mounted. Each of these control members, indicated generally at 32, preferrably includes a knurled knob 25, suitable for easy manual adjustment, provided on the upper end of a threaded shaft 26 which extends downwardly through a tapped bore provided in top plate 13. A suitable lock nut 28 may be provided for maintaining each of the control members in a given position of adjustment once it has been turned into place. As will be apparent from an examination of FIGS. 1 and 10, each of the control members may be axially movable along the axis of its stem 26 to present a free end 30 in various vertical positions of adjustment for interfering contact with a cam or boss 24 associated with shaft 33 via the plate 21. As seen in FIG. 10, the illustrated control member 32 has been moved to a fully retracted position wherein the boss 24, thereshown slightly engaging free end 30, is not appreciably deflected to move the associated shaft 33 and restricting member 71 into restricting relation to orifice 76. However, as seen in FIG. 1, another such independently adjustable control member, above shaft 33 in FIG. 1, is shown adjusted to a lower position wherein its free end 30 causes deflection of shaft 30, against the bias of spring 59, as the boss 24 passes beneath the control member. Each of the control members may therefore be individually adjusted for moving the restricting member 71 relative to orifice 76 to control the timing period or interval during which the drive means is operating in a timing mode, between indexing modes, and thus the time for operation of an associated hydraulically controlled device then connected via the aforedescribed flow distributing valves and outlet lines.

Manual adjustment of the position of the cam means, and thus the operation of the sequence of positions thereof, may be provided through the provision of a hand operated knob 17 having a stem portion 16 secured to the upper end 18 of shaft 33. The normal sequential operation of the flow control valves 47, and the associated hydraulically operated devices, can therefore be manually advanced through rotation of knob 17 beyond the drive normally imparted by the hydraulically operated drive means in an indexing operation. During such manual advance of the camming means and associated drive wheel 60, the wheel merely turns past the spring biased dog which would be moved concurrently to a fully indexed position preparatory to a timing mode operation.

Visually observable means are also provided for indicating visually the position of the opposed piston members of the hydraulic drive means. A vertical pin 132 is preferrably secured to block 92, as seen in FIGS. 5, 8 and 9, extends vertically upwardly therefrom as seen in FIG. 1 and is visible through a slot 133 formed in top plate 13 as seen in FIG. 2. The visually observable movement of pin 132 can assist the operator in observing the speed of a timing mode operation of the pistons in addition to his observing any sound of operation of the mechanism during its indexing and timing mode operations. In addition, an indicator 177 may be provided upon the upper surface of hand knob 17 to indicate which of the associated control members is operating the associated shaft cam 24 to thus indicate which of the machine operations are then being controlled.

Having thus described a preferred exemplary embodiment of the hydraulic controller, in accordance with the present invention, it should be noted by those skilled in the art that various modifications, alterations and adaptations thereof may be made within the scope and spirit of the present invention which is defined within the following claims.

I claim:

1. A hydraulic controller for controlling the operation of a plurality of hydraulically operated devices in a predetermined sequence of individually adjustable timed intervals of operation for each device, said controller being supplied from a source of hydraulic fluid under a substantially constant pressure and comprising:

distributor means for distributing the flow of hydraulic fluid from said source individually to said operated devices in a predetermined manner in response to operation of said distributor means through a sequence of individual positions of adjustment thereof;

hydraulically operated drive means for operating said distributor means through the sequence of positions, said drive means being operable in an indexing mode to index said distributor means between positions of adjustment and in a timing mode between indexing modes to maintain said distributor means in a dwell at individual positions of adjustment;

means for supplying hydraulic fluid from said sources to said drive means; and means for independently adjustably controlling the time of operation of said drive means in its timing mode for each individual position of adjustment of said distributor means relative to another position of adjustment of said distributor means, whereby each of said operated devices may be individually operated for an individually adjustable timed interval of operation.

2. The hydraulic controller of claim 1 wherein said means for independently adjustably controlling the time of operation of said drive means includes means for modifying the flow of said fluid relative to said drive means during said timing modes of operation thereof and a plurality of individually adjustable members, each corresponding to one of the positions of adjustment of said distributor means, for individually and adjustably operating said modifying means as said distributor means moves through its sequence of positions of adjustment.

3. The hydraulic controller of claim 2 wherein:
said drive means for operating said distributor means comprises first and second opposed hydraulically operated pistons in first and second associated cylinders, respectively, said first piston having an effective working diameter greater than that of said second piston, whereby said first piston normally overrides said second piston in said indexing mode; and
said means for modifying the supply of hydraulic fluid relative to said drive means comprises means for selectively controlling the release of fluid from said first cylinder to reverse the movement of said pistons and, by adjusting the rate of release of fluid from said first cylinder, control the speed of return of said pistons in the timing mode thereof.

4. The hydraulic controller of claim 1 wherein said distributor means comprises:
a plurality of fluid flow distributing valves, each having inlet means for connection to said source, outlet means for connection to one of said operated devices and a movable valve member for selectively interconnecting said inlet and outlet means; and
cam means associated with each of said fluid flow distributing valves for operating the associated valve member in a predetermined sequence of valve positions upon advancement of said cam means relative thereto by said drive means.

5. The hydraulic controller of claim 4 wherein:
said hydraulically operated drive means includes a timing mode drive piston and cylinder, an indexing mode drive piston and cylinder, force translating means associated with said cam means for translating reciprocal motion of said pistons into advancement motion for said cam means and piston mounting means for mounting said pistons in opposed driving relation to said force translating means;
said hydraulic fluid flow system means includes fluid flow line means for connecting both said cylinders to said source of hydraulic fluid; and
said indexing piston is provided with a larger effective diameter of surface exposed to said hydraulic fluid than that of said timing piston, whereby said indexing piston overrides said timing piston when hydraulic fluid is equally supplied to said drive means cylinders from said source during said indexing mode.

6. The hydraulic controller of claim 5 wherein said force translating means comprises:
a ratchet wheel associated with said cam means, a pivotable ratchet mounted on a pivoted lever arm driven by said pistons in a reciprocal arcuate movement to drive said wheel in a one direction advancement and manually adjustable means for holding said ratchet in an inactive position out of engagement with said wheel.

7. The hydraulic controller of claim 5 wherein said hydraulic fluid flow system means comprises:
reversing valve means associated with said fluid flow line means and an outlet line for alternately connecting said indexing mode cylinder to said source of hydraulic fluid or to said outlet line;
means associated with said reversing valve means and pistons for operating said reversing valve to connect said indexing mode cylinder to said outlet line at the end of an indexing mode drive of said indexing piston, said timing piston then overriding said indexing piston in a timing mode drive of said timing piston, and for connecting said indexing mode cylinder to said source of hydraulic fluid at the end of said timing mode drive of said timing piston.

8. The hydraulic controller of claim 5 wherein said hydraulic fluid flow system means comprises:
adjustable fluid flow restricting means associated with said outlet line for adjustably restricting the flow of hydraulic fluid from said indexing mode cylinder to thereby regulate the speed of said timing piston in its timing mode drive and thus determine the time of the interval for the operation of the devices operated by the associated fluid flow distributing valves.

9. The hydraulic controller of claim 8 wherein said adjustable fluid flow restricting means includes a valve orifice, an orifice restrictor member and means for mounting said restrictor member for adjustable movement relative to the valve orifice.

10. The hydraulic controller of claim 9 wherein said means for mounting said restrictor member comprise:
a mounting shaft and means for biasing said shaft to a valve open position wherein said restrictor member is withdrawn relative to said orifice;
connecting means between said shaft and said cam means for rotating said shaft in response to advancement of said cam means;
a shaft cam extending laterally of said shaft; and
a plurality of adjustable timing control members mounted to said controller in an array about said shaft in adjustable interfering contact with said shaft cam as it passes thereby to move said restrictor member toward said orifice, restricting fluid flow therethrough, due to deflection of said shaft against its bias as said shaft cam passes a given timer control member and in an amount adjustable by the adjustment of said control member.

11. A hydraulic controller for controlling the operation of a plurality of hydraulically operated devices in a determinable sequence of adjustable timed intervals of operation of each such device, said controller being supplied with a source of hydraulic fluid under a substantially constant pressure and comprising:
a plurality of fluid flow distributing valves, each having inlet means for connection to said source, outlet means for connection to one of said operated devices and a movable valve member for selectively interconnecting said inlet and outlet means;
cam means associated with each of said fluid flow distributing valves for operating the associated valve member in a predetermined sequence of valve positions upon advancement of said cam means relative thereto; and
hydraulic drive means for advancing said cam means relative to said valves to index them between said sequence of positions and maintain them in timed dwell intervals, said drive means compris  ̣:
venting means for selectively venting hydraulic fluid from said drive means to modify the drive of said drive means during a dwell mode;
fluid flow restrictor means for adjustably restricting the flow of fluid through said venting means to control the speed of operation of said drive means and thereby provide an adjustable interval of dwell of said cam means and means for selectively adjusting said fluid flow restrictor means for varying the time of each of a plurality of said fluid flow distributing valves independently of each other in said positions thereof.

12. The hydraulic controller of claim 11 wherein said cam means comprises a plurality of cam discs mounted on a cam shaft, each said disc including a laterally extending non-circular peripheral lip, and wherein said moveable valve member of each of said distributing valves includes a lip entraining means for entraining the associated cam lip and thereby cause movement of said valve member upon rotation of said cam shaft in a manner predetermined by the configuration of said non-circular lip.

13. The hydraulic controller of claim 11 wherein said fluid flow restrictor means includes a valve orifice, an orifice restrictor member and means for mounting said restrictor member for adjustable movement relative to the valve orifice.

14. The hydraulic controller of claim 13 wherein said means for mounting said restrictor member comprise:
   a mounting shaft and means for biasing said shaft to a valve open position wherein said restrictor member is withdrawn relative to said orifice;
   connecting means between said shaft and said drive means for rotating said shaft in response to advancement of said drive means;
   a shaft mounted cam extending laterally of said shaft; and
   a plurality of adjustable timing control members mounted to said controller in an array about said shaft in adjustable interfering contact with said shaft mounted cam to thereby move said restrictor member toward said orifice, restricting fluid flow therethrough, due to deflection of said shaft against its bias as said shaft cam passes a given timing control member.

15. A hydraulic controller for controlling the operation of a plurality of hydraulically operated devices comprising:
   fluid distributor means having a plurality of dwell positions for distributing hydraulic fluid from a source thereof to each of a plurality of said operated devices in a predetermined sequence corresponding to a sequence of positions of dwell of said distributor means;
   hydraulically operated drive means for operating said distributor means through its sequence of positions to operate said devices in corresponding sequence;
   means for supplying hydraulic fluid from said source to said drive means for operating said drive means in an indexing mode wherein said distributor means is indexed between its positions; and
   means for providing a selected dwell of said distributor means at each of said individual positions independently of each other including means for modifying the flow of said fluid for said drive means between said indexing modes whereby an associated controlled device is operated for the period of said dwell.

16. The hydraulic controller of claim 15 wherein said drive means for operating said distributor means comprises:
   first and second opposed hydraulically operated pistons in first and second associated cylinders, respectively, said first piston having an effective working diameter greater than that of said second piston, whereby said first piston normally overrides said second piston in said indexing mode.

17. The hydraulic controller of claim 16 wherein said means for modifying the supply of hydraulic fluid to said drive means comprises:
   means for selectively controlling the release of fluid from said first cylinder to reverse the movement of said pistons and, by adjusting the rate of release of fluid from said first cylinder, control the speed of return of said pistons in a timing mode thereof.

18. The hydraulic controller of claim 15 wherein said fluid distributor means comprises:
   a plurality of fluid flow distributing valves, each having inlet means for connection to said source, outlet means for connection to one of said operated devices and a moveable valve member for selectively interconnecting said inlet and outlet means; and
   cam means associated with each of said fluid flow distributing valves for operating the associated valve member in a predetermined sequence of valve positions upon advancement of said cam means relative thereto by said drive means.

19. The hydraulic controller of claim 18 wherein:
   said hydraulically operated drive means includes a timing mode drive piston and cylinder, an indexing mode drive piston and cylinder, force translating means associated with said cam means for translating reciprocal motion of said pistons into advancement motion for said cam means and piston mounting means for mounting said pistons in opposed driving relation to said force translating means;
   said hydraulic fluid flow system means includes fluid flow line means for connecting both said cylinders to said source of hydraulic fluid; and
   said indexing piston is provided with a larger effective diameter of surface exposed to said hydraulic fluid than that of said timing piston, whereby said indexing piston overrides said timing piston when hydraulic fluid is equally supplied to said drive means cylinders from said source during said indexing mode.

20. The hydraulic controller of claim 19 wherein said force translating means comprises:
   a ratchet wheel associated with said cam means, a pivotable ratchet mounted on a pivoted lever arm driven by said pistons in a reciprocal arcuate movement to drive said wheel in a one direction advancement and manually adjustable means for holding said ratchet in an inactive position out of engagement with said wheel.

21. The hydraulic controller of claim 19 wherein said hydraulic fluid flow system means comprises:
   reversing valve means associated with said fluid flow line means and an outlet line for alternately connecting said indexing mode cylinder to said source of hydraulic fluid or to said outlet line;
   means associated with said reversing valve means and pistons for operating said reversing valve to connect said indexing mode cylinder to said outlet line at the end of and indexing mode drive of said indexing piston, said timing piston then overriding said indexing piston in a timing mode drive of said timing piston, and for connecting said indexing mode cylinder to said source of hydraulic fluid at the end of said timing mode drive of said timing piston.

22. The hydraulic controller of claim 19 wherein said hydraulic fluid flow system means comprises:
   adjustable fluid flow restricting means associated with said outlet line for adjustably restricting the flow of hydraulic fluid from said indexing mode cylinder to thereby regulate the speed of said timing piston in its timing mode drive and thus determine the time of the interval for the operation of the devices operated by the associated fluid flow distributing valves.

23. The hydraulic controller of claim 22 wherein said adjustable fluid flow restricting means includes a valve orifice, an orifice restrictor member and means for mounting said restrictor member for adjustable movement relative to the valve orifice.

24. The hydraulic controller of claim 23 wherein said means for mounting said restrictor member comprise:
   a mounting shaft and means for biasing said shaft to a valve open position wherein said restrictor member is withdrawn relative to said orifice;
   connecting means between said shaft and said cam means for rotating said shaft in response to advancement of said cam means;
   a shaft cam extending laterally of said shaft; and
   a plurality of adjustable timing control members mounted to said controller in an array about said shaft in adjustable interfering contact with said shaft cam as it passes thereby to move said restrictor member toward said orifice, restricting fluid flow therethrough, due to deflection of said shaft against its bias as said shaft cam passes a given timer control member and in an amount adjustable by the adjustment of said control member.

* * * * *